United States Patent
Bigford et al.

(10) Patent No.: US 11,065,894 B2
(45) Date of Patent: Jul. 20, 2021

(54) ENGAGEABLE FLUID INTERFACE MEMBERS AND CONNECTORS

(71) Applicant: HEWLETT-PACKARD DEVELOPMENT COMPANY, L.P., Spring, TX (US)

(72) Inventors: Rosanna L. Bigford, Corvallis, OR (US); David N. Olsen, Corvallis, OR (US); Christopher John Arnold, Vancouver, WA (US); Paul Allan Osborne, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,413

(22) PCT Filed: Sep. 28, 2017

(86) PCT No.: PCT/US2017/053926
§ 371 (c)(1),
(2) Date: Oct. 3, 2019

(87) PCT Pub. No.: WO2019/066844
PCT Pub. Date: Apr. 4, 2019

(65) Prior Publication Data
US 2020/0215835 A1 Jul. 9, 2020

(51) Int. Cl.
*B41J 2/175* (2006.01)
*B41J 25/34* (2006.01)

(52) U.S. Cl.
CPC .................................... *B41J 25/34* (2013.01)

(58) Field of Classification Search
CPC .. B41J 2/17503; B41J 2/1752; B41J 2/17523; B41J 2/17553; B41J 25/34
See application file for complete search history.

(56) References Cited

U.S. PATENT DOCUMENTS

| | | |
|---|---|---|
| 5,886,718 A | 3/1999 | Johnson |
| 6,382,784 B2 | 5/2002 | Pawlowski, Jr. et al. |

(Continued)

FOREIGN PATENT DOCUMENTS

| | | |
|---|---|---|
| CA | 2449617 | 12/2004 |
| CN | 1273553 | 11/2000 |

(Continued)

OTHER PUBLICATIONS

David Zwang, Production Inkjet—The Next Wave: Super Web Digital with Memjet Aspen, Feb. 12, 2015, http://www.graphicmonthly.ca/blogs/?b_id=24.

*Primary Examiner* — Scott A Richmond
(74) *Attorney, Agent, or Firm* — Trop Pruner & Hu PC

(57) ABSTRACT

In some examples, a fluid ejection assembly is removably mountable in a system, and includes a fluid ejection device, and a removable frame on which the fluid ejection device is mounted. The removable frame includes a plurality of fluid interface members that share a common design to releasably engage with a plurality of fluid interface connectors together as the removable frame is brought into engagement with a support structure in the system and on which the plurality of fluid interface connectors are mounted. Engagement of a first fluid interface member with a first fluid interface connector establishes a gas path through the first fluid interface member and the first fluid interface connector, and engagement of a second fluid interface member with a second fluid interface connector establishes a liquid path through the second fluid interface member and the second fluid interface connector, the liquid path to deliver a liquid to the fluid ejection device.

19 Claims, 6 Drawing Sheets

(56) References Cited

U.S. PATENT DOCUMENTS

| | | | |
|---|---|---|---|
| 6,588,880 B1* | 7/2003 | Gasvoda | B41J 2/17509 |
| | | | 347/50 |
| 7,188,937 B2 | 3/2007 | Wilson et al. | |
| 8,454,135 B2 | 6/2013 | Umeda et al. | |
| 8,474,955 B2 | 7/2013 | Lucas et al. | |
| 8,646,864 B2 | 2/2014 | Rosati et al. | |
| 2008/0309739 A1* | 12/2008 | Takahashi | B41J 2/17509 |
| | | | 347/85 |
| 2016/0009082 A1* | 1/2016 | Chen | B41J 2/1404 |
| | | | 347/40 |
| 2017/0113475 A1* | 4/2017 | Johnson | B41J 29/06 |
| 2019/0061349 A1* | 2/2019 | Kanaris | B41J 2/14145 |

FOREIGN PATENT DOCUMENTS

| | | |
|---|---|---|
| CN | 2559486 | 7/2003 |
| CN | 1459375 | 12/2003 |
| CN | 101323212 | 12/2008 |
| CN | 105142911 | 12/2015 |
| CN | 106414095 | 2/2017 |
| CN | 107000434 | 8/2017 |
| CN | 107000439 | 8/2017 |
| CN | 107020818 | 8/2017 |
| EP | 0863011 | 9/1998 |
| EP | 1384589 | 1/2004 |
| EP | 2607083 | 6/2013 |
| EP | 3202578 | 8/2017 |
| JP | 2013226739 | 11/2013 |
| WO | WO-2014133575 | 9/2014 |
| WO | WO-2015183288 | 12/2015 |
| WO | WO 2016048270 | 3/2016 |

* cited by examiner

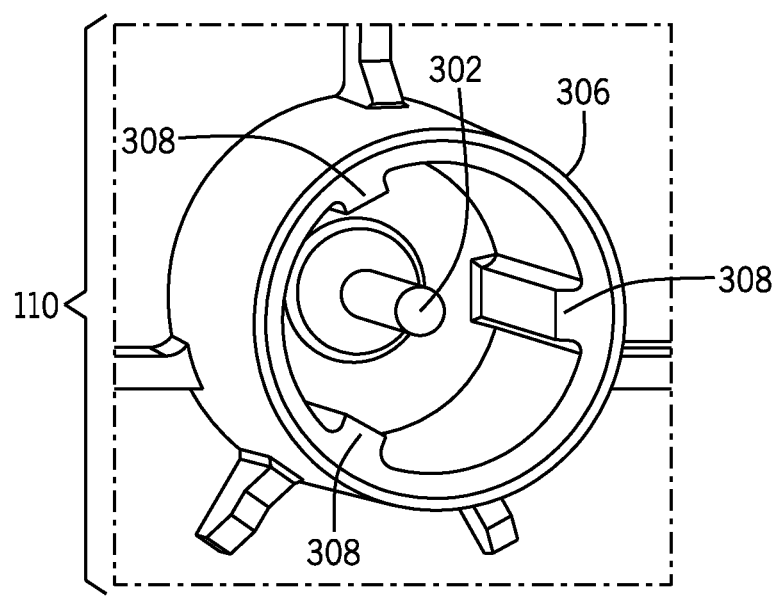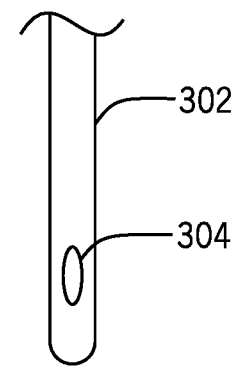
FIG. 3A          FIG. 3B
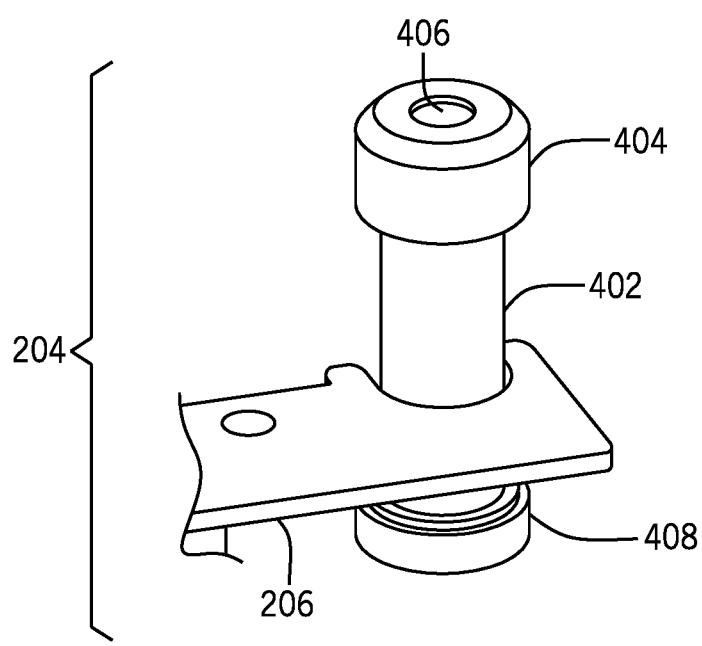
FIG. 4

ENGAGEABLE FLUID INTERFACE MEMBERS AND CONNECTORS

BACKGROUND

A printing system can include a printhead that has nozzles to dispense printing fluid to a target. In a two-dimensional (2D) printing system, the target is a print medium, such as a paper or another type of substrate onto which print images can be formed. Examples of 2D printing systems include inkjet printing systems that are able to dispense droplets of inks. In a three-dimensional (3D) printing system, the target can be a layer or multiple layers of build material deposited to form a 3D object.

BRIEF DESCRIPTION OF THE DRAWINGS

Some implementations of the present disclosure are described with respect to the following figures.

FIG. 3A is a perspective view of a fluid interface member that includes a needle, according to some examples.

FIG. 3B illustrates a needle of a fluid interface member, according to some examples.

FIG. 4 is a perspective view of a fluid interface connector mounted on a manifold of a system, according to some examples.

Figure 1:
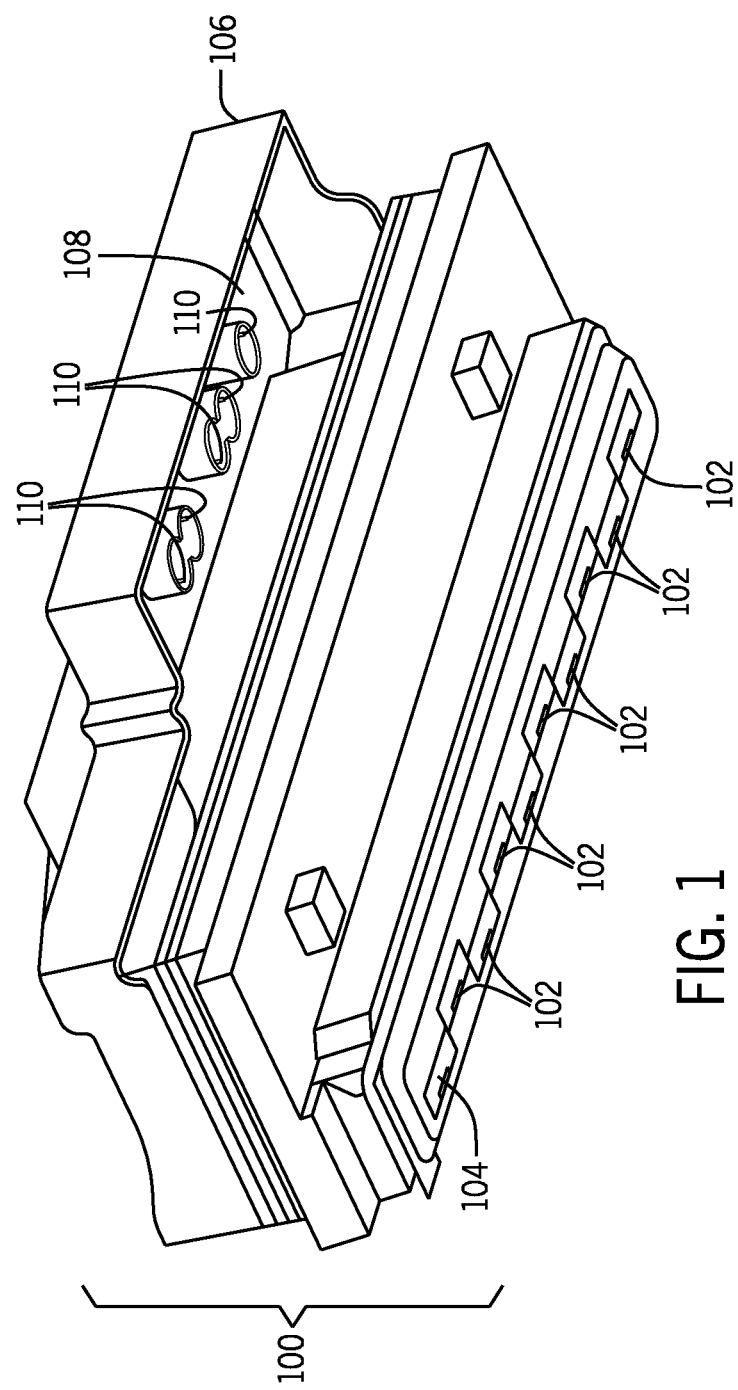
FIG. 1 is a lower perspective view of a printbar, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Also, terms such as "lower," "upper," "below," "above," or any other terms indicating relative orientations of components can refer to a relative orientation when the components are arranged vertically. However, if the components have a different arrangement (e.g., a horizontal arrangement, a diagonal arrangement, etc.), then such terms can specify a different relative orientation (side-by-side orientation, left-right orientation, diagonal orientation, etc.).

A printing system can include multiple components that are connected together. For example, a printbar can be removably installed into the printing system. A "printbar" can refer to an assembly that includes fluid ejection devices, such as in the form of fluid ejection dies. For example, the fluid ejection devices can be mounted on a print surface of the printbar across a dimension (e.g., width) of the printbar.

Fluids pass to the printbar from another component of the printing system when the printbar is installed in the printing system, such as a manifold of the printing system. A "manifold" can refer to a support structure that includes fluid channels to allow fluids to communicate from inlet ports of the manifold to fluid interface connectors of the manifold. The fluids can include printing agents (in liquid form) and a gas such as air.

A printing system can be a two-dimensional (2D) or three-dimensional (3D) printing system. A 2D printing system dispenses printing fluid, such as ink, to form images on print media, such as paper media or other types of print media. A 3D printing system forms a 3D object by depositing successive layers of build material. Printing agents dispensed from the 3D printing system can include ink, as well as agents used to fuse powders of a layer of build material, detail a layer of build material (such as by defining edges or shapes of the layer of build material), and so forth.

In some examples, a gas interface connector to pass air from a manifold of a printing system to a printbar can have a different design from fluid interface connectors used to pass printing agents (such as in the form of liquids) to the printbar. In such examples, the gas interface connector is provided at a location away from the fluid interface connectors. As a result of the different designs and separation of the gas interface connector and the fluid interface connectors, engagement of the gas interface connector and the fluid interface connectors when the printbar is installed in the printing system can involve multiple steps. For example, an assembler can first engage the fluid interface connectors of the manifold to the printbar, and then engage the gas interface connector of the manifold to the printbar.

However, in printing systems where printbars are to be removably installed in the printing systems by end users, the multi-step interconnection of the fluid interface connectors and gas interface connector with a printbar results in a complex installation and removal procedure that an end user may find challenging.

In accordance with some implementations of the present disclosure, a fluid interface arrangement is provided that allows a user to install a printbar in a printing system while engaging fluid interface connectors of a manifold with the printbar together, where the fluid interface connectors include a first fluid interface connector for communicating a liquid and a second fluid interface connector for communicating a gas. The fluid interface connectors share a common design and are mounted in the manifold in the printing system. When the user installs the printbar in the printing system, such as by moving the printbar downwardly (or in a different direction) into engagement with the manifold, fluid interface members on the printbar are engaged to the respective fluid interface connectors together. As a result, the connection of both liquid and gas paths between the printbar and the manifold can be performed in response to a single user action.

The fluid interface members on the printbar are releasably engaged with the fluid interface connectors of the manifold. The connections between the fluid interface members and the fluid interface connectors are make-break connections that allow a user to engage the fluid interface members with the fluid interface connectors, and later to disengage the fluid interface members from the fluid interface connectors where fluid interface connectors automatically close upon disengagement to avoid spilling or leaking fluids from the fluid interface connectors after disengagement.

Although reference is made to a fluid interface arrangement for use in a printing system in some examples, it is noted that techniques or mechanisms of the present disclosure are applicable to other types of fluid dispensing systems used in non-printing applications that are able to dispense fluids through nozzles. Examples of such other types of fluid dispensing systems include those used in fluid sensing systems, medical systems, vehicles, fluid flow control systems, and so forth.

Also, although reference is made to a printbar in some examples, it is noted that techniques or mechanisms according to some implementations can also be applied to other types of fluid ejection assemblies, where a fluid ejection assembly can include a fluid ejection device (e.g., a fluid ejection die) and a removable frame on which the fluid ejection device is mounted to allow the fluid ejection assembly to be removably mountable in a fluid ejection system.

FIG. 1 is a perspective view of a fluid ejection assembly 100 that can be removably mounted in a printing system, according to some examples. For example, the fluid ejection assembly 100 can be a printbar. Removably mounting a fluid ejection assembly (such as a printbar) in a system can refer to the ability to install the fluid ejection assembly (such as a printbar) in the printing system, followed by removal of the fluid ejection assembly (such as a printbar) from the printing system.

The ensuing discussion refers to a "printbar 100." It is noted that techniques or mechanisms according to some implementations of the present disclosure can be applied to other types of fluid ejection assemblies.

The printbar 100 includes multiple fluid ejection devices 102, such as in the form of fluid ejection dies. Each fluid ejection device 102 includes nozzles through which fluids are dispensed. In a printing system, a fluid ejection die can also be referred to as a printhead die. The fluid ejection devices 102 are mounted on a lower surface 104 of the printbar 100. The lower surface 104 of the printbar 100 (and therefore the fluid ejection devices 102) face toward a target that is to be formed using fluid ejected through nozzles of the fluid ejection devices 102). In a 3D printing system, the fluids include agents that can be used in 3D printing a 3D object (the target). In 2D printing, the fluids can include ink that can be dispensed onto a print medium (the target), such as paper, plastic, and so forth.

The printbar 100 also includes a printbar cover 106, which generally covers an upper portion of the printbar 100. Underneath the printbar cover 106 is a chamber 108 defined inside the printbar cover 106. Fluid interface members 110 can be arranged in the chamber 108. In examples according to FIG. 1, there are five fluid interface members 110. Although a specific number of fluid interface members 110 is depicted in FIG. 1, it is noted in other examples, a different number of fluid interface members 110 can be used. For example, there can just be two fluid interface members, with a first fluid interface member used to communicate a gas, and a second fluid interface member to communicate a liquid. In further examples, there can be multiple fluid interface members for communicating gas, and/or multiple fluid interface members for communicating liquid.

In examples according to FIG. 1, the fluid interface members 110 face downwardly to engage with corresponding fluid interface connectors (depicted in FIG. 2) when the printbar 100 is installed into a printing system. In different examples, the fluid interface members 110 can face in a difference direction. For example, the fluid interface members 110 can face towards a side or upwardly, depending on how the printbar 100 is installed into a printing system.

Figure 2:
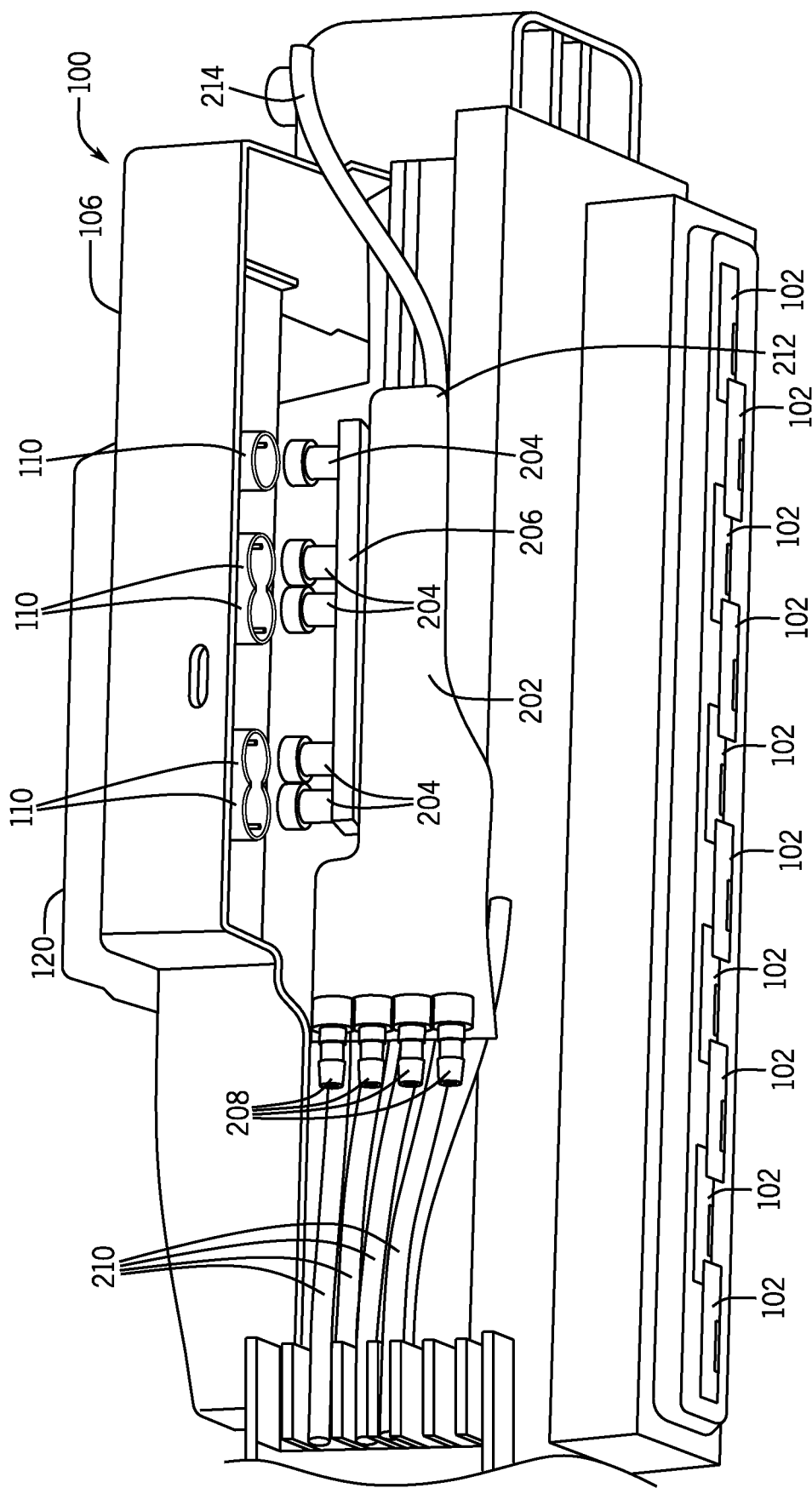
FIG. 2 is a perspective view of an assembly that includes a printbar and a manifold, according to some examples.

FIG. 2 shows the printbar 100 and a manifold 202 that has fluid interface connectors 204 mounted on the manifold 202. In FIG. 2, the printbar 100 is shown positioned right before the fluid interface members 110 are engaged with the corresponding fluid interface connectors 204. As shown in FIG. 2, the fluid interface members 110 are spaced apart from the corresponding fluid interface connectors 204. Once the printbar 100 is fully engaged with the manifold 202 (using mounting structures), the fluid interface members 110 are connected to corresponding fluid interface connectors 204.

The fluid interface members 110 share a common design, and the fluid interface connectors 204 share a common design. The fluid interface members 110 share a common design if the fluid interface members 110 are formed to have a common shape or form factor and have the same types of parts. Similarly, the fluid interface connectors 204 share a common design if the fluid interface members 204 are formed to have a common shape and have the same types of parts. Forming the fluid interface members 110 and the fluid interface connectors 204 with respective common designs allows for ease of manufacture, since the same type of fluid interface members 110 and the same type of fluid interface connectors 204 can be used to establish both liquid and gas paths.

Also, by forming the fluid interface members 110 and the fluid interface connectors 204 with respective common designs, the fluid interface members 110 and the fluid interface connectors 204 can be releasably engaged with together as the printbar 100 is brought into engagement with manifold 202. In other words, as a user installs the printbar 100 onto the manifold 202, the fluid interface members 110 engage the fluid interface connectors 204 at substantially the same time (i.e., within the time period during which the printbar 100 is attached to the manifold 202 in one installation step). As a result, user convenience is enhanced when installing and removing the printbar 100.

The fluid interface members 110 and the fluid interface connectors 204 also provide inline fluid interconnects, which enhances the compactness of the fluid interface arrangement.

The manifold 202 has a support structure 206 in which the fluid interface connectors 204 are mounted. In the examples shown in FIG. 2, the fluid interface members 110 are to engage with upper portions of respective fluid interface connectors 204 when the printbar 106 is brought into engagement with the manifold 202.

The manifold 202 includes liquid inlet ports 208, which are connected to respective liquid conduits 210 (e.g., in the form of hoses) that are connected to the liquid inlet ports 208. The liquid conduits 210 are to deliver printing fluids (such as different agents for 3D printing or different inks for 2D printing) to the manifold 202 through the respective liquid inlet ports 208.

The manifold 202 also has a gas inlet port 212 that is connected to a gas conduit 214 (e.g., in the form of a hose). The gas conduit 214 can deliver a gas to the manifold 202 through the gas inlet port 212.

In the example of FIG. 2, the right-most fluid interface member 110 and the right-most fluid interface connector 204 (when engaged) establish a gas path. Thus, gas injected through the gas conduit 214 passes into the manifold 202, and is communicated through an inner channel of the manifold 202 to the right-most fluid interface connector 204.

The gas then passes through the gas path established by the right-most fluid interface connector 204 and the right-most fluid interface member 110 into the printbar 100. The gas delivered into the printbar 100 can be used for various purposes discussed further below.

The four left fluid interface connectors 204 and fluid interface members 110 establish respective liquid paths that allow liquids received from the liquid conduits 210 to be passed through inner channels of the manifold 202 and the liquid paths to the printbar 100. The liquids received from the liquid conduits 210 can ultimately be dispensed from nozzles of the fluid ejection devices 102 of the printbar 100.

In examples according to FIG. 2, the liquid conduits 210 for delivering liquids are connected to liquid inlet ports 208 arranged on the left of the manifold 202 (in the orientation shown in FIG. 2), while the gas conduit 214 for delivering a gas is connected to the gas inlet port 212 arranged on the right side of the manifold 202 (in the orientation shown in FIG. 2). In other examples, the liquid conduits 210 and gas conduit 214 can be connected to different sides or portions of the manifold 202.

FIG. 2 further shows that the printbar cover 106 has a handle 120 that a user can grip to install the printbar 100 into a printing system, or remove the printbar 100 from the printing system.

FIG. 3A is a front perspective view of a fluid interface member 110 according to some examples. The fluid interface member 110 includes a needle 302. As used here, a "needle" can refer to an elongated member that can engage with another structure, such as a structure of a fluid interface connector 204. As shown in FIG. 3B, the needle 302 has a side opening 304 (or alternatively, multiple side openings 304) to allow for a gas or liquid to enter through the side opening(s) 304 and into an inner channel of the needle 302.

As further shown in FIG. 3A, a frame 306 surrounds the needle 302. In examples according to FIG. 3A, the frame 306 is generally cylindrical in shape. In other examples, the frame 306 can have a different shape. As depicted in FIG. 3A, alignment features 308 are provided at different locations in the inner wall of the frame 306. The alignment features 308 are to align the fluid interface member 110 when engaging with a corresponding fluid interface connector, so that the needle 302 is aligned with a respective inlet of the corresponding fluid interface connector.

FIG. 4 is a side perspective view of a fluid interface connector 204. In examples according to FIG. 4, the fluid interface connector 204 includes a cylindrical housing 402. In different examples, the housing 402 can have the different shape.

An upper portion of the housing 402 is provided with a crimp cover 404, which extends around the upper portion of the housing 402. The crimp cover 404 can be made of a compressible material, such as a compressible metal or some other compressible material. When the frame 306 of the fluid injection member 110 is fitted over the crimp cover 404, the alignment features 308 of the frame 306 presses radially inwardly on the outer surface of the crimp cover 404, to provide a firm engagement between the cover 306 and the crimp cover 404.

In addition, the alignment features 308 when engaged with the outer surface of the crimp cover 404 aligns the needle 302 relative to an inlet 406 at the upper portion of the fluid interface connector 204. In some examples, the inlet 406 is in the form of a septum. The septum has a slit that allows the needle 302 to pass through the septum and into an inner chamber of the housing 402 of the fluid interface connector 204. The septum can be formed of a polymer (e.g., polyisoprene) or other material that allows for the inlet 406 to be a re-closable inlet. The re-closable inlet 406 when pierced by the needle 302 allows for the needle 302 to extend into the inner chamber of the housing 402 of the fluid interface connector 204 to establish a fluid communication between the needle 302 and the fluid interface connector 204. When the needle 302 is subsequently removed from the inlet 406, the re-closable inlet 406 can close.

As further depicted in FIG. 4, the fluid interface connector 204 is attached to the support frame 206 of the manifold 202 (FIG. 2). A lower portion of the fluid interface connector 204 has a compliant mounting structure 408 that mounts to respective openings of the manifold 202. The compliant mounting structures 408 can be formed of a compliant material, such as polymer and so forth. The compliant mounting structure 408 allows the fluid interface connector 204 to be resiliently mounted to the manifold 202, to allow for easier alignment of the fluid interface members 110 with the fluid interface connectors 204.

Figure 5:
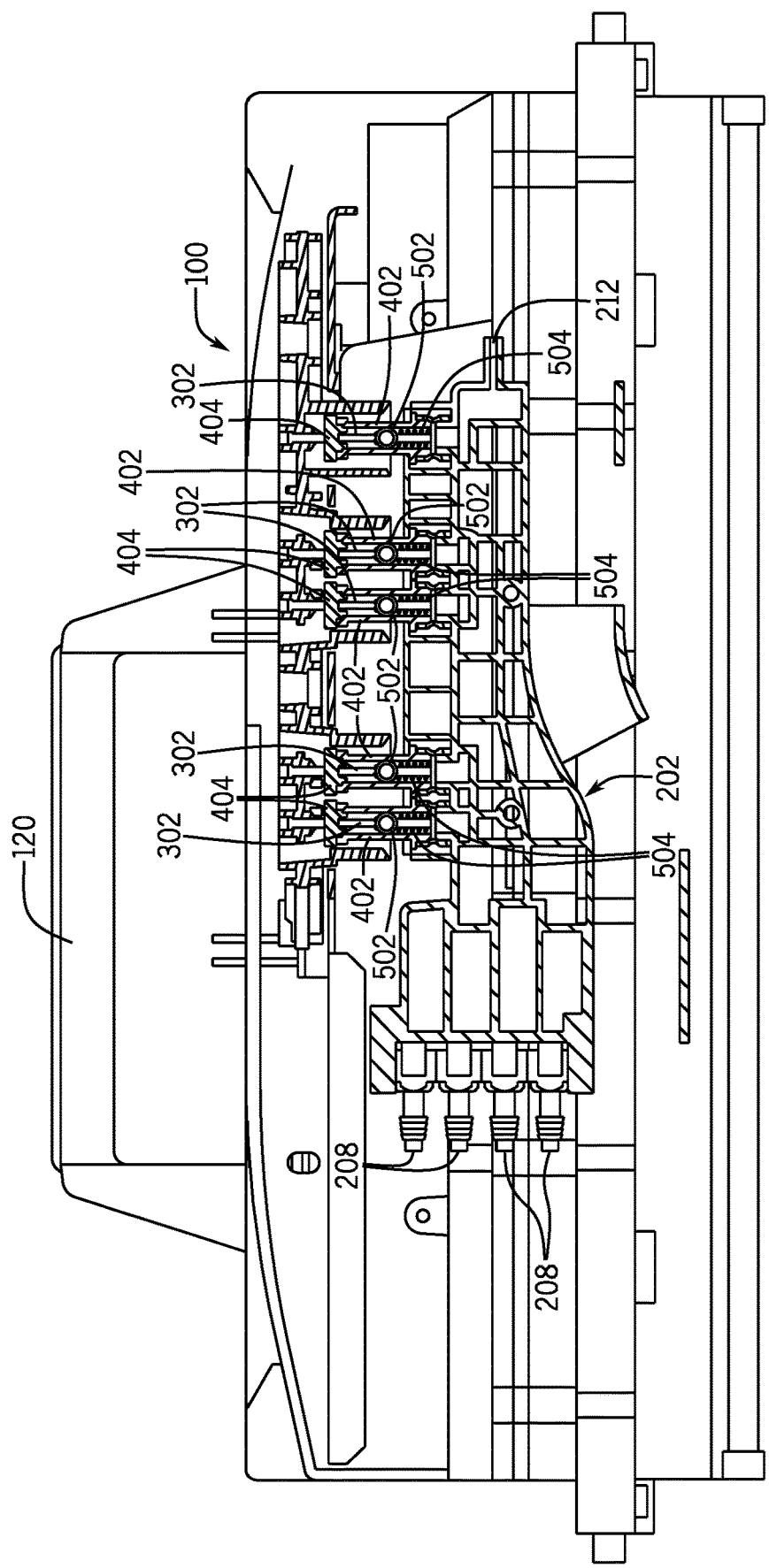
FIG. 5 is a side sectional view of an assembly including a printbar and a manifold, according to further examples.

FIG. 5 is a side sectional view of an assembly that includes the printbar 100 and the manifold 202. FIG. 5 shows the liquid inlet ports 208 and gas inlet port 212 (without the corresponding conduits 210 and 214 attached to such inlet ports). As shown in FIG. 5, each of the needles 302 of the fluid interface members 110 has passed through the respective inlet 406 of the fluid interface connector 204.

Within each housing 402 of a corresponding fluid interface connector 204 is arranged a valve, which in the example of FIG. 5 is a ball valve 502. As shown in FIG. 5, each needle 302 has pushed the ball valve 502 away from the inlet 406 to provide an open position of the ball valve 502. Each ball valve 502 is biased upwardly by a biasing member 504, which can be a spring. Each needle 302 pushes the ball valve 502 downwardly against the force applied by the biasing member 504.

When the needle 302 is removed from the fluid interface connector 204 (withdrawn from the inlet 406), the biasing member 504 pushes the ball valve 502 upwardly and engages the ball valve 502 against the corresponding upper portion of the fluid interface connector 204 (the closed position of the ball valve 502), to maintain a seal at each corresponding inlet of the fluid interface connector 204 when the needle 302 is removed from the fluid interface connector 204.

Figure 6:
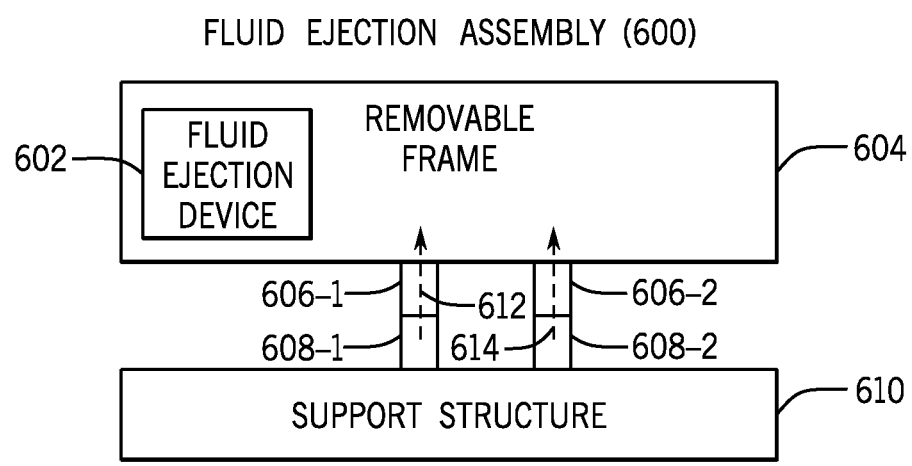
FIG. 6 is a block diagram of a fluid ejection assembly that is removable and mountable in a system, according to further examples.

FIG. 6 is a block diagram of a fluid ejection assembly 600 removably mountable in a system, such as a printing system or other type of fluid dispensing system. The fluid ejection assembly 600 can be a printbar (e.g., the printbar 100 discussed above) or another type of fluid ejection assembly that can be mounted in a system to establish fluid paths (including a liquid path and a gas path).

The fluid ejection assembly 600 includes a fluid ejection device 602, and a removable frame 604 on which the fluid ejection device 602 is mounted. If the fluid ejection assembly 600 is a printbar, then the removable frame 604 can be a housing of the printbar.

The removable frame 604 has a plurality of fluid interface members 606-1, 606-2 that share a common design to releasably engage with a plurality of fluid interface connectors 608-1, 608-2 (e.g., the fluid interface connectors 204 discussed above) together as the removable frame is brought into engagement with a support structure 610 (e.g., the manifold 202 discussed above) in the system and on which the plurality of fluid interface connectors 608-1, 608-2 are mounted. Although just two fluid interface members 606-1, 606-2 and two fluid interface connectors 608-1, 608-2 are shown in FIG. 6, it is noted that additional fluid interface members and fluid interface connectors can be provided in other examples.

Engagement of the first fluid interface member 606-1 with the first fluid interface connector 608-1 establishes a gas path 612 through the first fluid interface member 606-1 and the first fluid interface connector 608-1, and engagement of the second fluid interface member 606-2 with the second fluid interface connector 608-2 establishes a liquid path 614 through the second fluid interface member 606-2 and the second fluid interface connector 608-2. The liquid path 612 delivers a liquid (e.g., a 3D printing agent or a 2D printing fluid) to the fluid ejection device 602.

Figure 7:
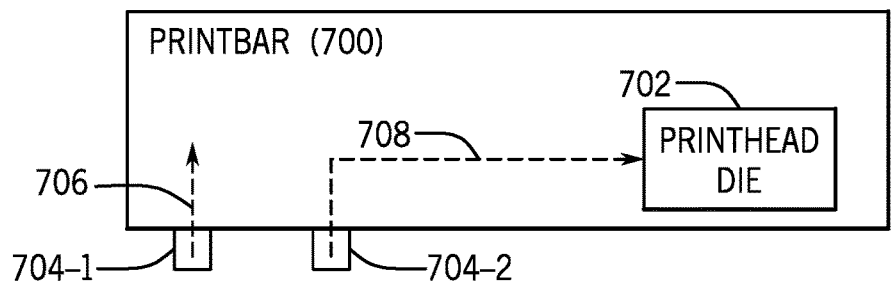
FIGS. 7 and 8 are block diagram of printbars according to various examples.

FIG. 7 is a block diagram of a printbar 700 for a printing system (2D or 3D printing system). The printbar 700 includes a printhead die 702, and a plurality of fluid interface members 704-1, 704-2 that share a common design to releasably engage with a plurality of fluid interface connectors (e.g., fluid interface connectors 204 discussed above) together as the printbar 700 is brought into engagement with a manifold (e.g., manifold 202 discussed above) of the printing system. The plurality of fluid interface connectors are attached to the manifold.

Engagement of a first fluid interface member 704-1 with a first fluid interface connector pierces a first septum of the first fluid interface connector to establish a gas path 706 through the first fluid interface member 704-1 and the first fluid interface connector, and engagement of a second fluid interface member 704-2 with a second fluid interface connector pierces a second septum of the second fluid interface connector to establish a liquid path 708 through the second fluid interface member 704-2 and the second fluid interface connector, the liquid path to deliver a liquid to the printhead die 702.

Figure 8:
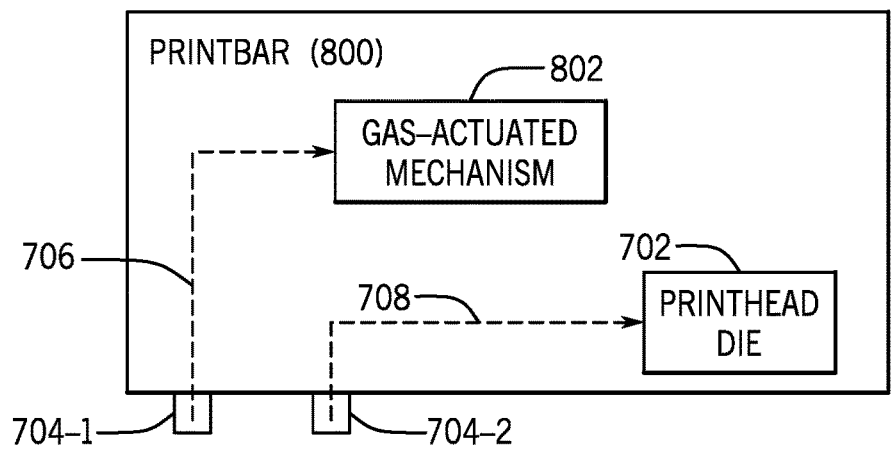

FIG. 8 is a block diagram of a printbar 800 for a printing system. The printbar 800 is similar to the printbar 700 of FIG. 7, except that the printbar 800 includes a gas-actuated mechanism 802 that is to be actuated in response to gas delivered over the gas path 706. The gas-actuated mechanism 802 can be used to perform various tasks. For example, the gas-actuated mechanism 802 can be used to perform a prime operation to inject gas into a fluid supply (containing a volume of printing agent, for example). In other examples, the gas-actuated mechanism 802 can include a regulator valve. Injecting the gas through the gas path 706 can be performed as part of testing the printbar 800, or during printing operations of the printbar 800.

Figure 9:
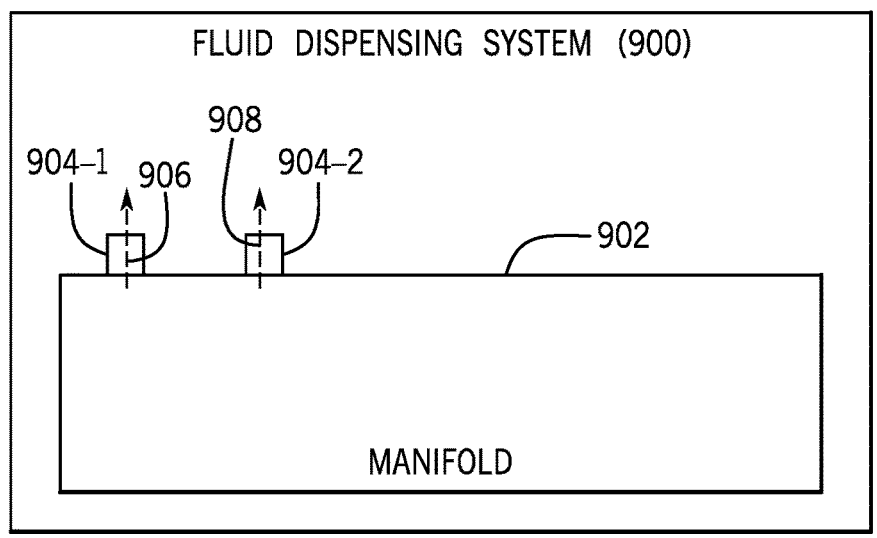
FIG. 9 is a block diagram of a fluid dispensing system according to further examples.

FIG. 9 is a block diagram of a fluid dispensing system 900 that includes a manifold 902, and a plurality of fluid interface connectors 904-1, 904-2 mounted on the manifold 902 to engage a plurality of fluid interface members (e.g., fluid interface members 110 discussed above) that share a common design. The plurality of fluid interface connectors 904-1, 904-2 releasably engage with the plurality of fluid interface members together as a removable frame carrying the plurality of fluid interface members is brought into engagement with the manifold 902. Engagement of a first fluid interface member with a first fluid interface connector 904-1 establishes a gas path 906 through the first fluid interface member and the first fluid interface connector 904-1, and engagement of a second fluid interface member with a second fluid interface connector 904-2 establishes a liquid path 908 through the second fluid interface member and the second fluid interface connector 904-2, the liquid path to deliver a liquid to the fluid ejection system 900.

Each respective fluid interface connector 904-1 or 904-2 includes a respective re-closable inlet (formed of a septum as discussed above, for example) to open when a respective fluid interface member is inserted through the respective re-closable inlet, and to close when the respective fluid interface member is removed from the respective re-closable inlet.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A printbar removably mountable in a system, comprising:
   a fluid ejection device;
   a removable frame on which the fluid ejection device is mounted and comprising a plurality of fluid interface members that share a common design to releasably engage with a plurality of fluid interface connectors together as the removable frame is brought into engagement with a support structure in the system and on which the plurality of fluid interface connectors are mounted,
   wherein engagement of a first fluid interface member with a first fluid interface connector establishes a gas path through the first fluid interface member and the first fluid interface connector, and engagement of a second fluid interface member with a second fluid interface connector establishes a liquid path through the second fluid interface member and the second fluid interface connector, the liquid path to deliver a liquid to the fluid ejection device; and
   a gas-actuated mechanism to be actuated by input gas passed through the gas path.

2. The printbar of claim 1, wherein the removable frame comprises a handle grippable by a user to install or remove the removable frame with respect to the support structure.

3. The printbar of claim 1, wherein the fluid ejection device comprises a fluid ejection die on the printbar.

4. The printbar of claim 3, comprising a plurality of fluid ejection dies.

5. The printbar of claim 1, wherein the plurality of fluid interface members comprise needles to insert into inlets of the plurality of fluid interface connectors as the removable frame is brought into engagement with the support structure.

6. The printbar of claim 5, wherein insertion of a needle of a respective fluid interface member into a corresponding inlet of a respective fluid interface connector causes actuation of a valve in the respective fluid interface connector from a closed position to an open position.

7. The printbar of claim 5, wherein each respective fluid interface member of the plurality of fluid interface members includes a corresponding frame around the needle of the respective fluid interface member, the corresponding frame of the respective fluid interface member to mount over an upper portion of a crimp cover of a respective fluid interface connector of the plurality of fluid interface connectors.

8. The printbar of claim 7, wherein the crimp cover comprises a compressible material, and wherein the corresponding frame of the respective fluid interface member when mounted over the upper portion of the crimp cover of the respective fluid interface connector causes radially inward compression of an outer surface of the crimp cover.

9. The printbar of claim 1, comprising:
a printbar cover that defines an inner chamber, wherein the plurality of fluid interface members are arranged inside the inner chamber.

10. The printbar of claim 9, wherein the plurality of fluid interface members inside the inner chamber of the printbar cover depend downwardly from an upper inner surface of the printbar cover.

11. A printbar for a printing system, comprising:
a printhead die;
a plurality of fluid interface members that share a common design to releasably engage with a plurality of fluid interface connectors together as the printbar is brought into engagement with a manifold of the printing system, the plurality of fluid interface connectors attached to the manifold, wherein engagement of a first fluid interface member with a first fluid interface connector pierces a first septum of the first fluid interface connector to establish a gas path through the first fluid interface member and the first fluid interface connector, and engagement of a second fluid interface member with a second fluid interface connector pierces a second septum of the second fluid interface connector to establish a liquid path through the second fluid interface member and the second fluid interface connector, the liquid path to deliver a liquid to the printhead die; and
a gas-actuated mechanism to be actuated by input gas passed through the gas path.

12. The printbar of claim 11, wherein the plurality of fluid interface members comprise needles to insert into inlets of respective septa of the plurality of fluid interface connectors as the printbar is brought into engagement with the manifold of the printing system.

13. The printbar of claim 12, wherein the septa are to close responsive to removal of the needles from the septa.

14. The printbar of claim 11, comprising:
a printbar cover that defines an inner chamber, wherein the plurality of fluid interface members are arranged inside the inner chamber.

15. A fluid ejection system comprising:
a manifold; and
a plurality of fluid interface connectors mounted on the manifold to engage a plurality of fluid interface members that share a common design and comprising needles, the plurality of fluid interface connectors to releasably engage with the plurality of fluid interface members together as a removable frame carrying the plurality of fluid interface members is brought into engagement with the manifold, wherein engagement of a first fluid interface member with a first fluid interface connector establishes a gas path through the first fluid interface member and the first fluid interface connector, and engagement of a second fluid interface member with a second fluid interface connector establishes a liquid path through the second fluid interface member and the second fluid interface connector, the liquid path to deliver a liquid to the fluid ejection system,
wherein each respective fluid interface connector of the plurality of fluid interface connectors comprises a ball valve that is actuated from a closed position to an open position responsive to insertion of a respective needle of the needles into an inlet of the respective fluid interface connector.

16. The fluid ejection system of claim 15, wherein each respective fluid interface connector of the plurality of fluid interface connectors includes a respective re-closable inlet to open when a respective fluid interface member is inserted through the respective re-closable inlet, and to close when the respective fluid interface member is removed from the respective re-closable inlet.

17. The fluid ejection system of claim 15, wherein the plurality of fluid interface connectors comprise cylindrical housings having upper portions comprising respective inlets into which the plurality of fluid interface members engage, wherein each respective upper portion of the upper portions comprises a septum formed of a resilient material that defines the inlet of the respective upper portion, the septum to close responsive to removal of a respective fluid interface member from the inlet of the respective upper portion, and wherein lower portions of the plurality of fluid interface connectors comprise compliant mounting structures to attach to the manifold.

18. The fluid ejection system of claim 17, wherein the upper portions comprise crimp covers formed of a compressible material, wherein each respective crimp cover of the crimp covers is compressed radially inward by engagement of a respective fluid interface member of the plurality of fluid interface members.

19. The printbar of claim 14, wherein the plurality of fluid interface members inside the inner chamber of the printbar cover depend downwardly from an upper inner surface of the printbar cover.

* * * * *